(12) United States Patent  
Atkins (10) Patent No.: US 7,729,112 B2  
(45) Date of Patent: Jun. 1, 2010

(54) MOUNTING FOR DISK DRIVE UNIT, RETAINING DEVICE AND METHOD OF LOADING A DISK DRIVE UNIT

(75) Inventor: Andrew William Atkins, Southampton (GB)

(73) Assignee: Xyratex Technology Limited, Havant, Hampshire (GB)

( * ) Notice: Subject to any disclaimer, the term of this patent is extended or adjusted under 35 U.S.C. 154(b) by 725 days.

(21) Appl. No.: 10/568,872

(22) PCT Filed: Sep. 7, 2004

(86) PCT No.: PCT/GB2004/003812

§ 371 (c)(1), (2), (4) Date: Jul. 28, 2006

(87) PCT Pub. No.: WO2005/024830

PCT Pub. Date: Mar. 17, 2005

(65) Prior Publication Data

US 2007/0195497 A1    Aug. 23, 2007

Related U.S. Application Data

(60) Provisional application No. 60/500,693, filed on Sep. 8, 2003.

(51) Int. Cl.  
G06F 1/16 (2006.01)  
H05K 7/16 (2006.01)  
A47B 81/00 (2006.01)  
A47F 7/00 (2006.01)

(52) U.S. Cl. .................... 361/679.34; 361/679.37; 361/679.39; 361/727; 312/223.2; 211/26

(58) Field of Classification Search .................. 361/683, 361/685, 686, 724–727, 679.31–679.4, 679.01–679.45, 361/679.55–679.59; 312/223.1, 223.2; 211/26  
See application file for complete search history.

(56) References Cited

U.S. PATENT DOCUMENTS

| 5,123,721 | A |   | 6/1992 | Seo |
|---|---|---|---|---|
| 5,269,698 | A |   | 12/1993 | Singer |
| 5,310,358 | A |   | 5/1994 | Johnson et al. |
| 5,673,171 | A | * | 9/1997 | Varghese et al. ............ 361/685 |
| 5,917,676 | A |   | 6/1999 | Browning |
| 6,166,901 | A |   | 12/2000 | Gamble et al. |

(Continued)

FOREIGN PATENT DOCUMENTS

| EP | 0 570 138 A2 | 11/1993 |
|---|---|---|
| WO | 97/06532 | 2/1997 |
| WO | 01/41148 A1 | 6/2001 |
| WO | 03/021597 A1 | 3/2003 |

*Primary Examiner*—Jayprakash N Gandhi  
*Assistant Examiner*—Nidhi Desai  
(74) *Attorney, Agent, or Firm*—Pillsbury Winthrop Shaw Pittman, LLP (57) ABSTRACT

A mounting for a disk drive unit includes a carrier for carrying a disk drive unit during required movement of the disk drive unit. The carrier defines a space into which the disk drive unit can be inserted, and the carrier is adapted to be inserted with the disk drive unit into a receiving frame for operational use. At lease two resilient devices are mounted on the carrier for securing the disk drive unit in the receiving frame when the carrier is inserted into the frame, at least one resilient device being mounted on each side of the carrier. Each resilient device is movably mounted on the carrier to allow movement of the device as a whole relative to the carrier, and the resilient device is arranged to secure the disk drive unit in the receiving frame by acting between disk drive unit and the receiving frame. A method of handling the disk drive unit comprises placing the disk drive unit into the carrier engaging a robotic device with a coupling structure projecting from the front of the carrier. The method then includes lifting the carrier by the robotic device and inserting the carrier into a receiving frame by a substantially horizontal movement.

17 Claims, 6 Drawing Sheets

U.S. PATENT DOCUMENTS

| | | |
|---|---|---|
| 6,209,842 B1 | 4/2001 | Anderson et al. |
| 6,297,962 B1 | 10/2001 | Johnson et al. |
| 6,456,489 B1 | 9/2002 | Davis et al. |
| 6,556,434 B1 * | 4/2003 | Chan et al. .................. 361/685 |
| 6,667,880 B2 * | 12/2003 | Liu et al. ............... 361/679.35 |
| 2002/0122294 A1 | 9/2002 | Mercer et al. |

* cited by examiner

MOUNTING FOR DISK DRIVE UNIT, RETAINING DEVICE AND METHOD OF LOADING A DISK DRIVE UNIT

CROSS REFERENCE TO RELATED APPLICATIONS

This is the U.S. National Phase of PCT/GB2004/003812, filed Sep. 7, 2004, which in turn claims priority to U.S. Provisional Patent Application No. 60/500,693, filed Sep. 8, 2003, both of which are incorporated herein in their entirety by reference.

The present invention relates in one aspect to a mounting for a disk drive unit such as disk drive unit which has a data storage disk, a movable disk head and main body supporting the disk and the head. The present invention relates in another aspect to a retaining device and a method of loading a disk drive unit into a mounting.

In a conventional disk drive unit the data storage disk is usually mounted horizontally for rotation about a vertical axis, and is mounted in a main chassis body. The disk head, which may be a read only head or a read and write head, is movably mounted on the main body of the disk drive unit, for movement over the disk to desired tracks. Although in some circumstances the disk drive unit may be permanently and rigidly fixed in a frame of other equipment, it often occurs that the disk drive unit must be mounted so as to be easily removable from a supporting frame. For example in a tester rack it is conventional to fit each disk drive unit into a separate carrier moulded of plastics material, and for the carrier then to be slotted into the tester rack. In other applications, a removable disk drive unit may be removably mounted in a computer.

In some arrangements the disk drive unit may be mounted vertically for rotation about a horizontal axis. In general in this specification, where an example of a disk drive unit is described with the disk in a horizontal plane, it is to be appreciated that the description applies equally well to a disk drive unit positioned in a vertical plane for rotation about a horizontal axis, or indeed in other configurations where appropriate.

A problem which arises in the operation of disk drive units occurs at the end of the seek movement of the disk head to a desired track. The access acceleration and deceleration of the actuator, containing the read/write heads, particularly on high performance disk drive units, results in an equivalent reaction to the main body of the disk drive unit. This reaction can cause the disk drive unit to oscillate in its mounting, and hence the reaction provides an input to the disk drive unit. The result is unwanted misregistration of the head to the track. In recent years the actuators on disk drive units have generally changed from linear to rotary operation, the read/write heads being moved in an arc across the disk, about a vertical axis (for a horizontal disk) positioned on the main body of the disk drive unit, outside the perimeter of the disk. The vibrations arising from acceleration and deceleration of such a rotary actuator produce rotary oscillation of the main body of the disk drive unit in a horizontal plane.

One way of reducing or avoiding the effects of such vibration is to mount the main body of the disk drive unit very firmly in a grounded frame, secured against rotary vibration, and another method is to mount the main body of the disk drive unit on a floating mounting, or one which allows movement only at such a low frequency that the actuator servo can follow the vibration with only a small error. If the disk drive unit is not mounted at one of these extremes (rigidly mounted or on a floating mounting) the mount vibration will appear on the head/track error signal after the disk drive unit has met its on-track criteria. The resulting misregistration is detected, causing what is generally known as a Write Fault Error, preventing the disk drive unit from writing, with a consequent reduction in performance of the disk drive unit.

In situations where easy removability of the disk drive unit is required, mounting at either of the extreme situations mentioned above is difficult. In a disk drive unit tester rack for example, removal should be as simple as possible. Nowadays, there is a desire for automation of movement of disk drive units and associated mountings such that there is an increased need for a mounting of a disk drive unit that is robust and enables easy automatic handling to be achieved.

In WO-A-01/41148 there is disclosed apparatus for testing disk drive units including a supporting structure for supporting a disk drive unit, referred to in the disclosure as a disk drive unit carrier, adapted to carry a disk drive unit and a temperature control device for controlling the temperature of the disk drive unit to be at a predetermined temperature during operation of the disk drive unit. An air flow control device controls the flow of air across the disk drive unit. In some arrangements there may be provided disk drive unit test apparatus for receiving a plurality of disk drive units, the test apparatus comprising a plurality of carriers each for receiving a respective disk drive unit. In the example described in this specification, the apparatus has a door at the front which can be opened or removed to allow a disk drive unit to be inserted into or removed from the carrier. A plurality of such carriers can be incorporated in or assembled into disk drive unit test apparatus, such as for example a test rack. This allows individual disk drive units to be moved into and out of the test apparatus.

It has been known in the past to secure a disk drive unit rigidly in a carrier by use of wedges. In WO-A-97/06532 a mounting for a disk drive unit comprises a supporting structure for supporting a disk drive unit, referred to in the disclosure as a carrier, defining a space into which the disk drive unit can be removably inserted for operational use. The carrier has a base and two opposed sides, and first and second wedge means which are movable to act between the main body of the disk drive unit and the side of the carrier, to secure the disk drive unit against movement relative to the carrier. The wedge means include wedges which are movable in a vertical direction by a control linkage operated automatically when the disk drive unit is inserted into the carrier. A disadvantage of the rigid mounting disclosed in WO-A-97/06532 is that where a plurality of disk drive units are mounted together in a common frame, for example in a tester, the rigid mounting results in cross torque between adjacent disk drive units during testing. Thus the rigid mounting allows transmission of high frequency disturbances from one disk drive unit to another. Thus although the rigid mounting can cure errors arising from the inertia of the disk head during movement, it can result in a further difficulty in cross talk (i.e. the transmission of vibration between adjacent drives) between disk drive units.

In U.S. Pat. No. 6,209,842 (Anderson et al) there is disclosed a mounting for a disk drive unit comprising a carrier for carrying the disk drive unit and four resilient members referred to as damping devices mounted on the carrier for securing the disk drive unit in a receiving frame, referred to as a system cabinet. The resilient elements are positioned two on each side of the carrier, two positioned towards the front of the carrier and two positioned towards the rear of the carrier. In operation the disk drive unit is mounted in the carrier which in turn is pushed into a bay defined by side walls of the bay. The damping devices are mounted on the carrier by bolts.

In WO-A-03/021597 there is disclosed a mounting for a disk drive unit. At least one retaining device is provided in such a manner that it is movably mounted on a carrier to allow movement of the retaining device as a whole.

According to a first aspect of the present invention there is provided a mounting for a disk drive unit, the mounting comprising: a carrier for carrying a disk drive unit during required movement of a said disk drive unit, the carrier defining a space into which a said disk drive unit can be inserted; and, at least one retaining device mounted on the carrier for securing a said disk drive unit in the carrier, in which the or each retaining device is pivotally mounted on the carrier and is arranged to provide vertical positioning control of a said disk drive unit in the carrier.

The invention provides a mounting for a disk drive unit, the mounting including a carrier and at least one retaining device mounted on the carrier. The retaining device is pivotally mounted on the carrier and is arranged to provide vertical positioning control of a disk drive unit in the carrier. The invention provides a mounting that enables robust and simple automatic handling of a mounting to be achieved. In particular, since vertical positioning control of the disk drive is provided by the pivotally mounted retaining device, a mounting having a disk drive unit therein can even be turned upside down without the disk drive unit falling out. This is clearly advantageous. Furthermore the mounting of the present invention enables easy insertion and removal of a disk drive unit to or from the mounting to be achieved.

According to a second aspect of the present invention, there is provided a retaining device for retaining a disk drive unit in a mounting device according to any preceding claim, the retaining device comprising: a connection point for pivotal connection to the mounting device and a spring member to bias the retaining device into the carrier of the mounting device when in rest position.

According to a third aspect of the present invention, there is provided a method of loading a disk drive unit into a mounting having a carrier for a disk drive unit and comprising at least one retaining device mounted on the carrier for securing a said disk drive unit in the carrier, in which the or each retaining device is pivotally mounted on the carrier and is provided with an engaging member to engage a said disk drive and arranged to provide vertical positioning control of a said disk drive unit in the carrier, the method comprising: inserting a said disk drive unit into the carrier such that the or each retaining member acts on a said disk drive unit to maintain a said disk drive unit in the carrier.

It is to be appreciated that where features of the invention are set out herein with regard to apparatus according to the invention, such features may also be provided with regard to a method according to the invention, and vice versa.

Embodiments of the invention will now be described by way of example with reference to the accompanying drawings in which:—

Figure 1:
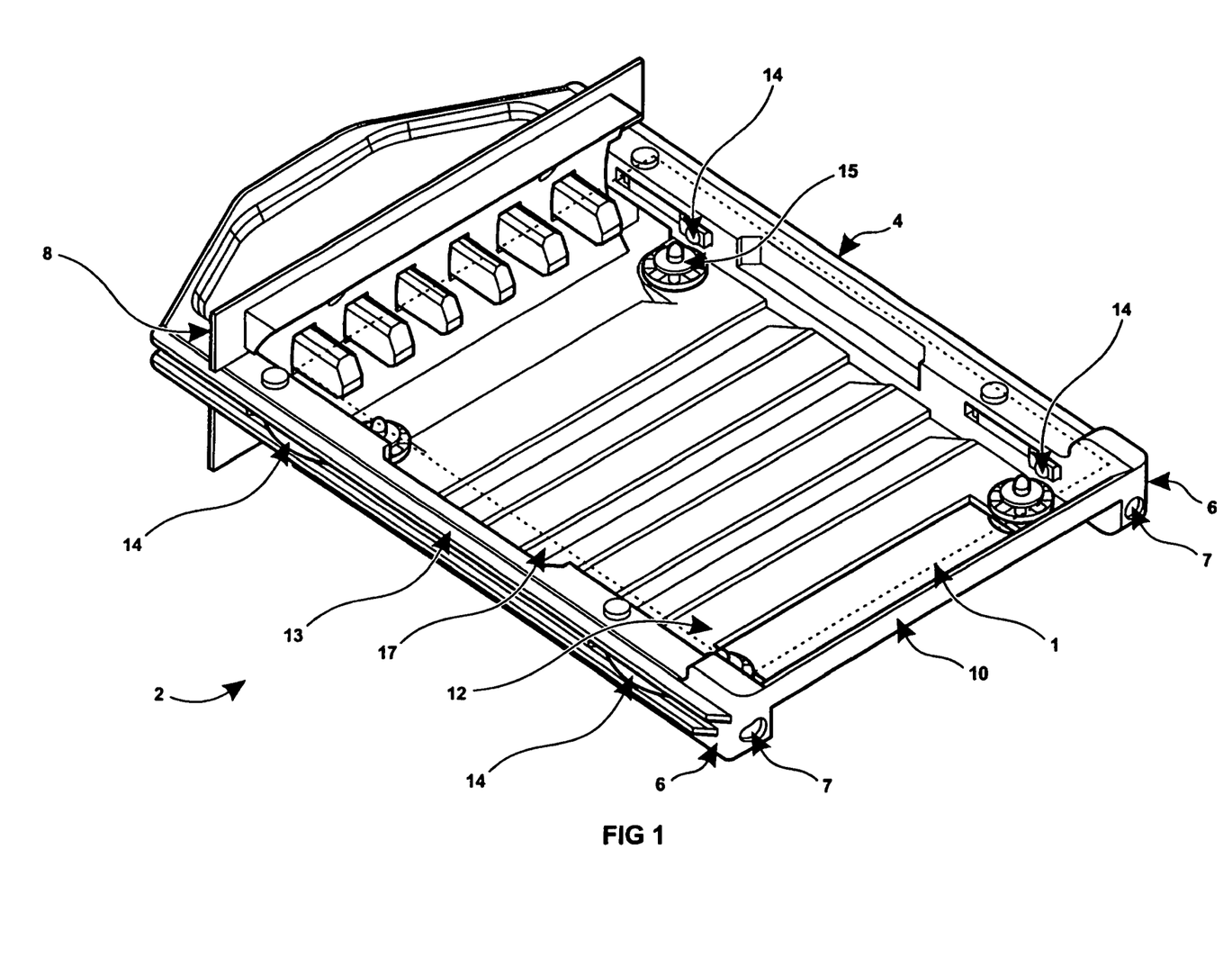
FIG. 1 is a diagrammatic perspective view from above of an example of a mounting for a disk drive unit embodying the invention.
Figure 5:
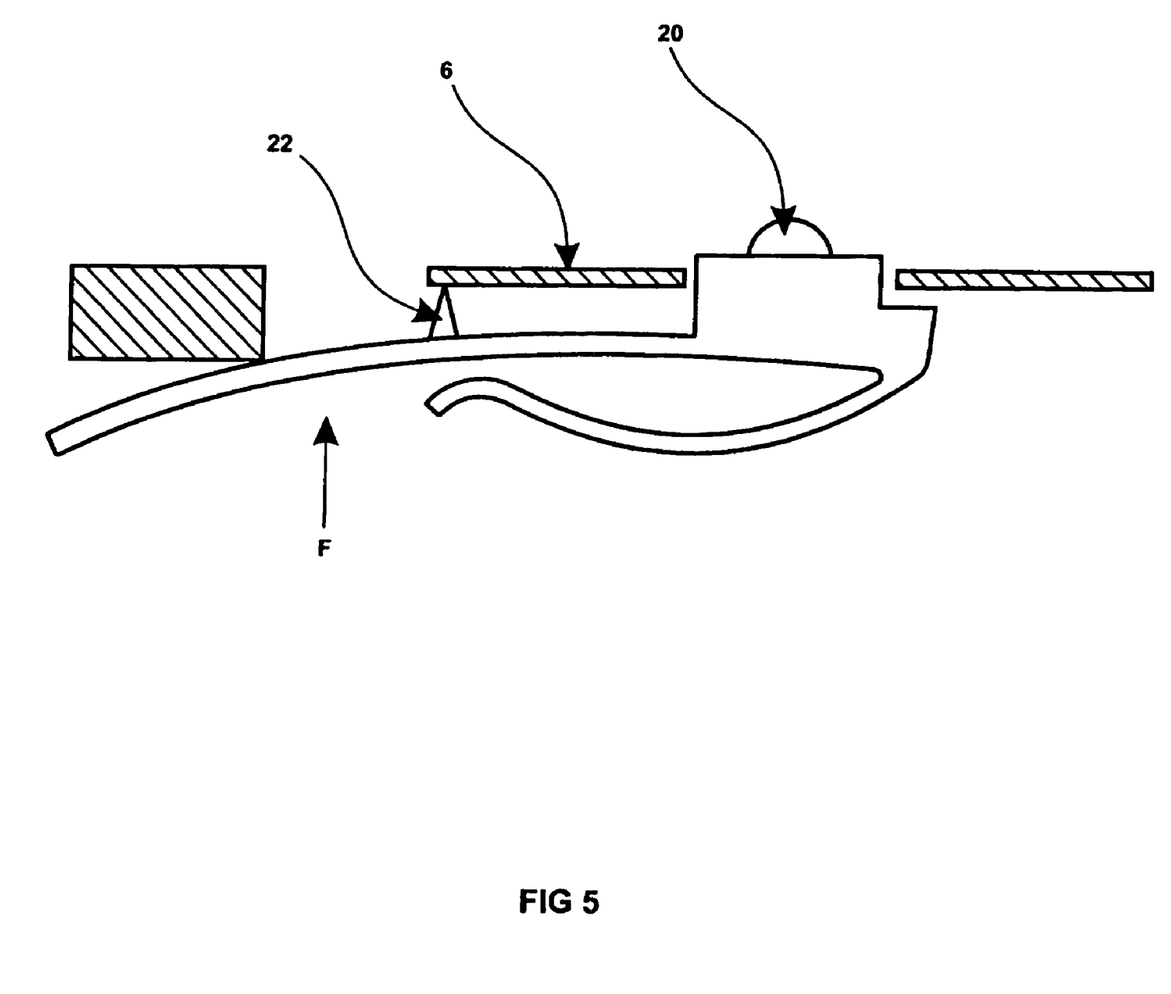
FIG. 5 shows a schematic cross section of a retaining device in position in a carrier wall; and, FIG. 6 is a diagrammatic perspective view shown partly from above, of a tester rack for receiving a plurality of disk drive units.

FIG. 1 shows a mounting 2 embodying the invention, for a disk drive unit 1 shown schematically in phantom. The mounting 2 comprises a carrier 4, also referred to as a carrier tray, for carrying a disk drive unit during required movement of the disk drive unit. The carrier 4 defines a space into which the disk drive unit can be inserted. The carrier 4 is adapted to be inserted with the disk drive unit into a receiving frame 30 shown by way of example in FIG. 5 as a tester rack 32. The receiving frame 30 of FIG. 5 provides a plurality of bays 34 each having a supporting structure including a pair of side rails 36, to be described more fully hereinafter. Referring again to FIG. 1, the carrier 4 is formed by two side wall portions 6, a front wall 8, a rear wall 10 and a floor 12. A retaining assembly for retaining the disk drive unit in the carrier includes four retaining devices 14 positioned with two retaining devices 14 towards the front of the carrier 4, and two retaining devices towards the rear of the carrier 4. Guide rails 13 are provided on the side walls 6 of the carrier 4. Holes 7 are provided at the rear end of the carrier 4, for engagement with e.g. a temperature control device, such as that described in our copending international application (agent's ref. AF2/P9715WO) of even date herewith.

Figure 2:
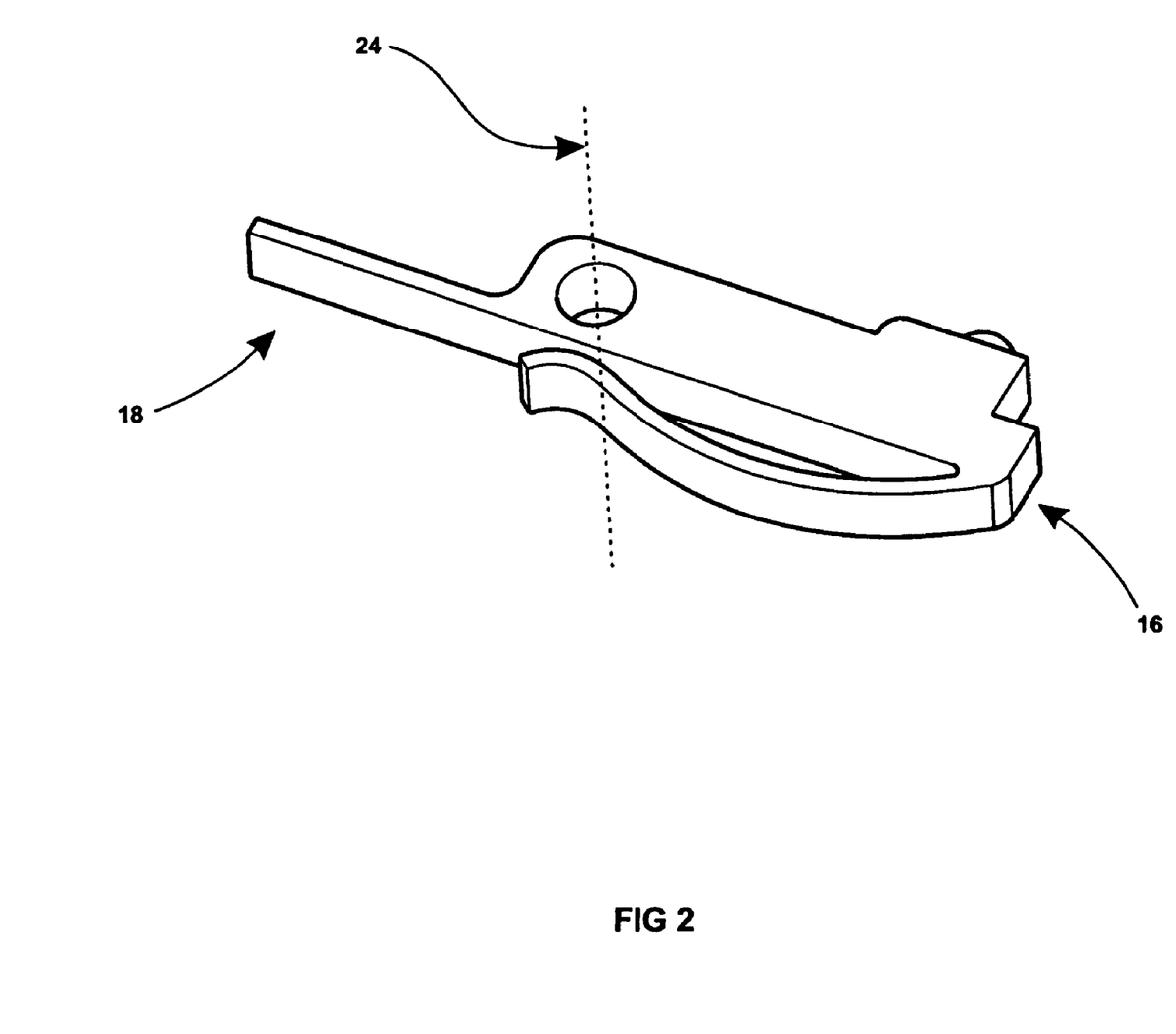
FIG. 2 is perspective view of a retaining device for retaining a disk drive unit in the mounting shown in FIG. 1.

As shown in FIG. 2, in this embodiment, each retaining device 14 comprises a first end 16 and a distal end 18. Each retaining device 14 also comprises an engaging member 20 (FIG. 3) arranged generally at the first end 16, the engaging member being operative to engage a disk drive unit when provided in the carrier 4. Each retaining device 14 is adapted to be pivotally mounted on the carrier 4. The distal end 18 of each retaining device 14 comprises a spring member and when in position in a carrier 4, the spring member 18 is operative to bias the first end 16 and the corresponding engaging member 20 into the carrier 4.

Considering now the construction of the retaining device 14 in detail, reference will be made to FIGS. 2 and 3. As shown in FIG. 2, each retaining device 14 comprises a first end 16 and a distal end 18. A pivot 22 is provided which enables rotation of the retaining device 14 about axis 24 shown in FIG. 2. The distal end 18 is formed from a resilient material so that it can function as a biasing spring when the retaining device 14 is arranged in a carrier 4. A lip 26 is provided at the first end 16 of the retaining device 14, and serves to limit movement of the retaining device, as will be explained in more detail later.

Figure 3:
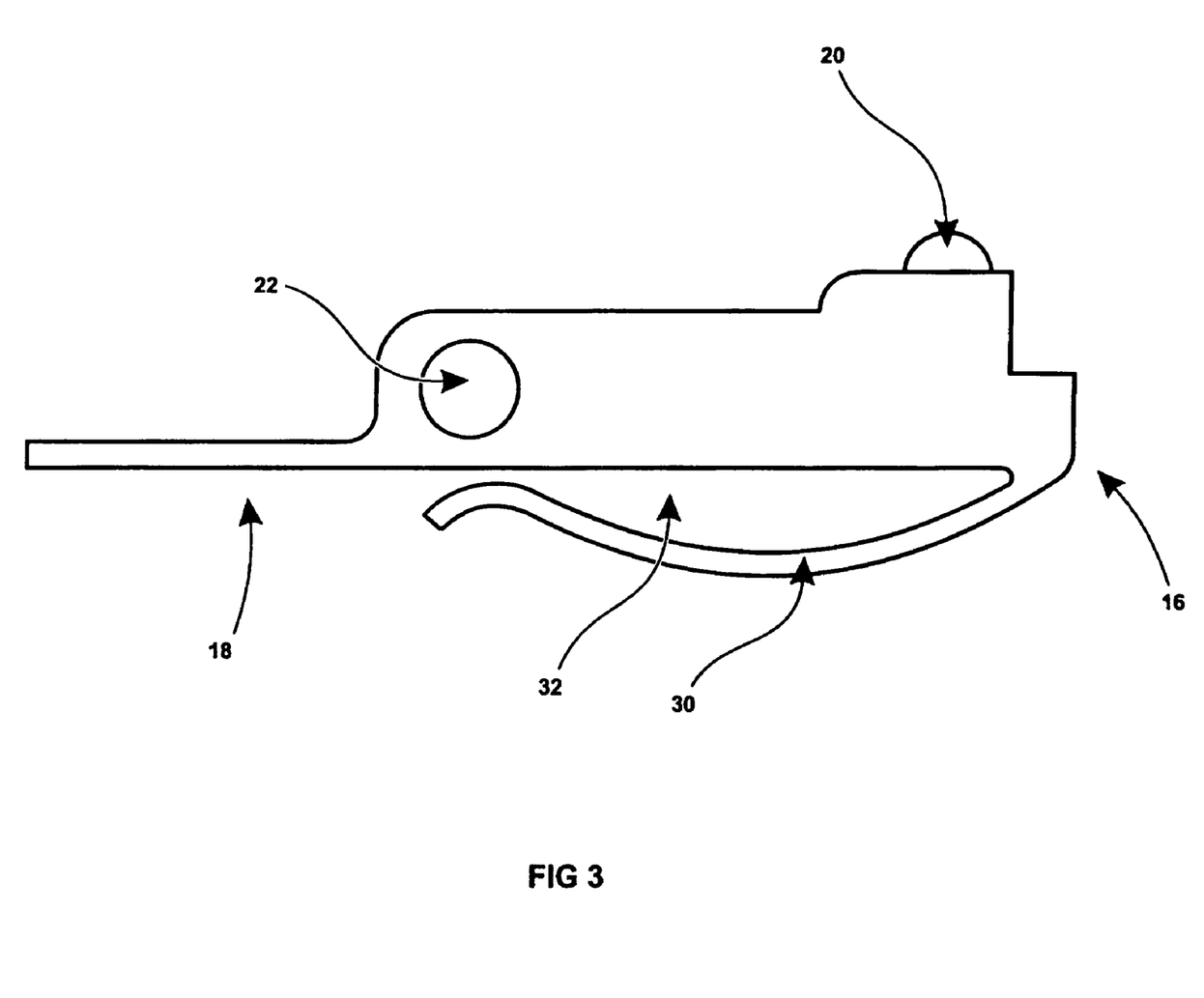
FIG. 3 is a plan view from above of the retaining device of FIG. 2.
Figure 4:
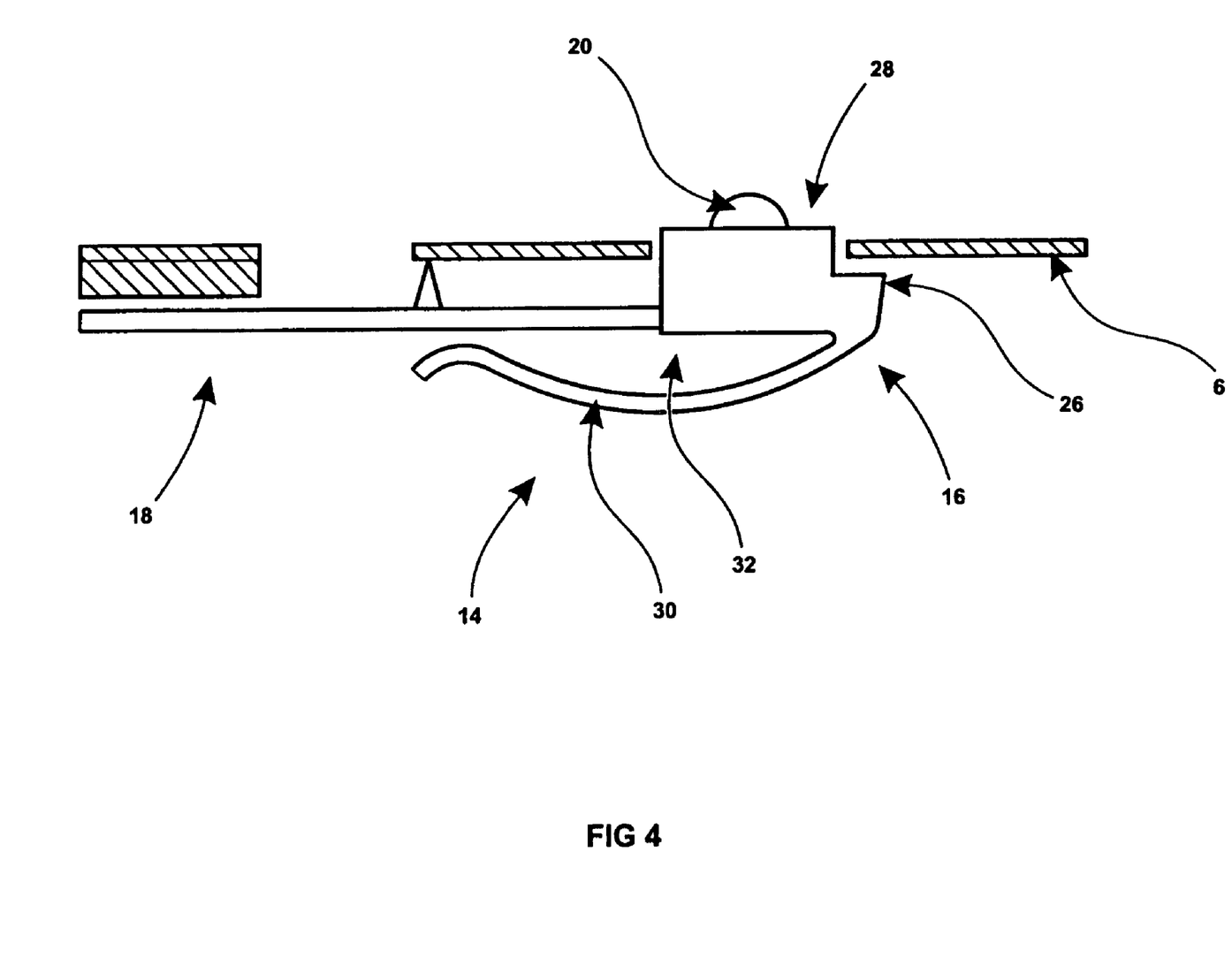
FIG. 4 shows a schematic cross section of a retaining device in position in a carrier wall.

FIG. 4 shows a schematic cross section of a retaining device 14 in position in a carrier wall 6. It can be seen that in this rest position i.e. a position in which the retaining device 14 is arranged in carrier 4 but no disk drive unit is provided in carrier 4, engaging member 20 is arranged inside the carrier (left-hand-side of wall 6 in FIG. 3). The lip 26 provided at the first end 16 of the retaining device 14 functions to limit the distance into the carrier 4 that the engaging member 20 can travel through opening 28 in wall 6. This is achieved by engagement of the lip 26 with the side wall. For reasons of clarity, a spacing is shown between the lip 26 and wall 6, however it will be appreciated that in position in the carrier 4, the lip 26 is usually but not always engaged with the wall 6.

Referring to all of FIGS. 3 and 4, a curved member 30 is provided on the outer (outer with respect to the space in carrier 4) side of retaining device 14. This member 30 defines a region 32 between the body of the retaining device 14 and the member 30. As will be explained below, this region 32 can be filled with a selected material to provide damping for a disk drive unit arranged within the carrier 4.

In a rest position the engaging member 20 of each retaining device 14 projects into the carrier 4 and is biased into this position by means of the spring 18. As explained above, the amount it projects into the carrier 4 is limited by interaction between the lip 26 and the wall 6.

When a disk drive unit is inserted into the carrier 4, the retaining device 14 is caused to pivot about its pivotal axis 24 against the bias of the spring 18 which thereby imparts a restraining force onto the disk drive unit being positioned within the carrier 4. The bias provided by the springs 18 and the retaining devices 14 is sufficient to maintain the disk drive unit in the carrier so that if, for example, jogged or knocked or even turned up-side-down in operation, the disk drive unit will be maintained within the carrier 4. As mentioned above, this is important in instances where disk drive units are moved automatically into and out of tester racks. It will be appreciated that the retaining device 14 can be provided as an independent unit for putting into a carrier 4 or alternatively it can be provided as an integral part of the carrier 4.

There will now be described with reference to FIGS. 1 and 6, the way in which a disk drive unit is inserted into a carrier 4. This may be done manually or alternatively automatically, for example, with the use of a robot. A disk drive unit can simply be positioned within the carrier 4 such that on entry into the carrier 4 the engaging members 20 of the restraining devices 14 are forced outwards by the contact with a side wall of the disk drive unit.

As will be explained below in an alternative method, it is possible to configure the retaining devices temporarily so that the engaging members 20 are positioned outside of the carrier 4. This is achieved by applying a force against the resilient member 18 between the pivot 22 in a region where a spacing is allowed in the wall of the carrier 4 to allow movement of the spring 18.

FIG. 5 shows a retaining device 14 in such a position. A force is applied in a direction of the interior of the carrier 4 and this causes a clockwise rotation of the first end 16 of the retaining device 14 about its pivot 22. With the retaining device in this configuration, a disk drive unit can be inserted into the carrier without any contact with the engaging member 20. In this position, the engaging member is arranged outside the space within the carrier. Accordingly, when a disk drive unit is then inserted into the carrier 4, there is initially no direct interaction with the retaining device 14. Once the force applied is removed, the retaining device 14 under the bias of spring 18 engages the disk drive unit. This is advantageous if there is a risk of damage of the disk drive unit by virtue of the interaction between the disk drive unit and the engaging member 20 of the retaining devices 14. The operation described above can be performed automatically by suitably arranged apparatus having an appropriately designed projection or finger automatically or manually to provide the force required to ensure the engaging member 20 is temporarily outside the carrier 4.

When a disk drive is inserted into the carrier 4, it is retained within the carrier by the action of the retaining devices 14. There will now be described with reference to FIGS. 1 and 6, the operation of the retaining devices 14 clamping a disk drive unit into the carrier 4 when, for example, the carrier and disk drive unit are inserted into a tester rack.

Figure 6:
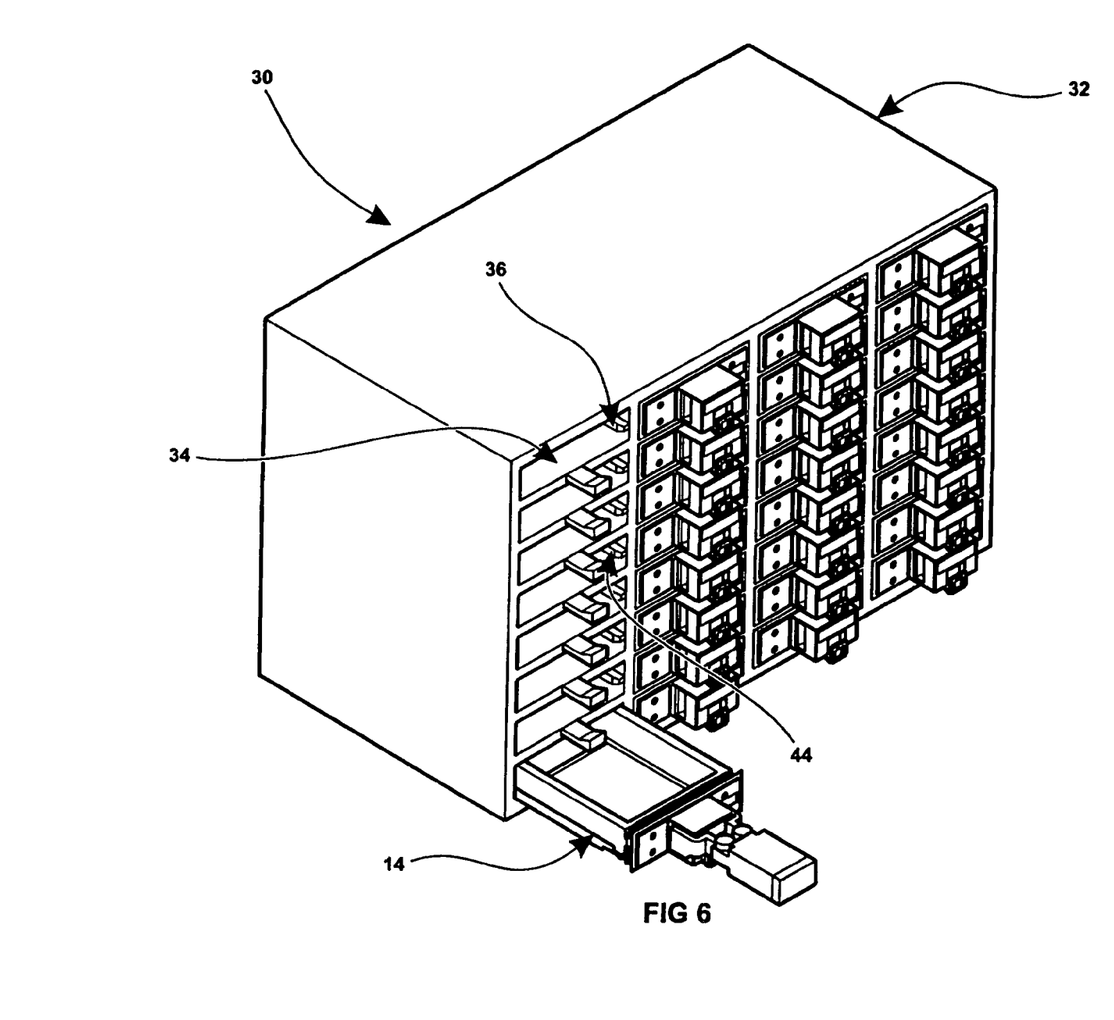

FIG. 6 is a diagrammatic perspective view shown partly from above, of a tester rack for receiving a plurality of disk drive units. In FIG. 6, there is shown a tester rack for housing disk drive units for testing. The rack provides a plurality of bays each having side rails 44 which locate in the guide rails 13 provided on the side walls 6 of the carrier 4. Each side rail 44 extends inwardly of the guide rails 13 on the carrier 4. The effect of this is that when the carrier 4 is fully installed and engaged with the side rails 44 the retaining devices 14 are engaged by the side rails 44 such that member 30 of each retaining device 14 is forced towards the body of the retaining devices 14 to which it is connected.

This has the effect of increasing the clamping force on the disk drive unit in the carrier 4. Of course, since lip 26 of the retaining device 14 will already be engaged with the side wall 6 of the carrier 4 (explained above), there will be no further inwards movement of the engaging member 20. However, the force with which the engaging member is maintained in contact with the disk drive unit is increased.

The engagement between the side rails 44 of the tester rack and the retaining members 14 is via the curved members 30. As explained above, each curved member 30 is resilient and the opening side of 32 is therefore reduced as a result of contact between the guide rails 44 and the retaining device 14. In a preferred example of the present invention, a damping material is provided within the opening 32. This ensures that when a disk drive is arranged within a carrier in the tester rack, vibration of the disk drive under test is damped. Suitable materials that may be used to provide damping include visco-elastic polymers such as visco-elastic polymers manufactured by Sorbothane, Inc., silicone-free damping gel, or any other material capable of providing suitable damping. It will be appreciated that in some cases no material may be added to the opening 32 and that in such cases, sufficient damping is provided by the retaining device 14 itself.

The mounting described above can be used for mounting a disk drive unit for insertion into a test rack. The mounting can also be used as a mounting for a disk drive unit during normal operation of the disk drive unit by an end user.

It will be understood that each engaging member 20 provided on the first end 16 of each retaining device 14, engages with a corresponding hole or depression in the side of a disk drive unit in place in the carrier. Disk drive units typically (according to accepted international standards) are provided with positioning holes to enable the disk drive to be positioned and locked in place e.g. in a computer. The retaining devices 14 are preferably arranged in the carrier 4, such that their corresponding engaging members 20 will present at the points where the holes or depressions are provided in the disk drive units according to the accepted standards. It will also be appreciated that the engaging member 20 provided on the retaining device 14 may be a hole or a depression to engage with a corresponding projection, if such exists, on the body of a disk drive unit.

In one example of the present invention, there are provided on the floor 12 of the carrier 4 a number of shock mounts 15. The shock mounts 15 serve to locate and support a disk drive unit when loaded in the carrier 4. The shock mounts 15 may be provided with spigots or any other means by which the disk drive unit can be located. The shock mounts are typically made of a material which is suitable to provide sufficient shock absorbency. Examples of suitable materials include visco-elastic polymers or any other material capable of providing sufficient shock absorbency. The shock mounts or spigots provide alignment of a disk drive unit inserted into the carrier either before or during engagement of the retaining devices 14. Furthermore, the spigots, which will engage with corresponding features on the underside of an inserted disk drive unit, provide restraint of the disk drive unit in a lateral direction during electrical connection to the disk drive unit. The electrical connection could be plugging or unplugging of a disk drive unit inserted in a tester rack as discussed above.

In addition, one or more air vents 17 may be provided on the bottom of the carrier 4 to enable a flow of air within the carrier. This flow of air can be used to regulate the temperature of the disk drive unit within the carrier 4. Reference is made to our copending International application (agents ref. AF2/P9715WO) of even date herewith, the entire content of which is hereby incorporated by reference.

There will now be described, with reference to FIG. 5, the overall operation of a carrier 4, loaded with a disk drive unit, into a tester rack. After the disk drive unit has been placed in the carrier 4, the carrier 4 is then presented to the tester rack 42, and engaged with the rails 44 as has been described above. The carrier 4 is then pushed home into the rack 42, and the retaining devices 14 are further engaged by the rails 44, so that the disk drive unit is firmly clamped by the retaining devices 14 being compressed.

During insertion of the carrier 4 into the rack 42, electrical connection is made between electrical connectors (not shown) on the inner, rear end of the disk drive unit and corresponding electrical connectors provided in the inner end region of each bay 43. In prior art arrangements where a disk drive unit has been rigidly clamped in a tester rack (for example as discussed above with reference to WO 97/06532) it has been necessary to provide that the electrical connector in the rear of the bay 43 has a floating mounting, to allow the connector to mate with the other connector when the disk drive unit is rigidly clamped. However in the embodiment shown in the Figures is not necessary. The electrical connector on the tester rack, and the electrical connector on the disk drive unit, may each be rigidly mounted. A suitable tapered lead-in is provided at each connector, so that any slight misalignment due to tolerance, is taken up by movement of the entire disk drive unit relative to the carrier 4. Because the retaining devices 14 allow a small amount of movement, whilst retaining the required clamping characteristics, the tolerances can be taken up by movement of the entire disk drive unit, rather than by movement of electrical connectors in a floating mounting relative to the tester rack. This allows simplification in the manufacture of the tester rack, with consequent savings in manufacturing costs, and maintenance costs.

In the embodiment described with reference to the drawings, a number of features combine to give an advantageous arrangement. The action of sliding the carrier 4 into the receiving frame causes the retaining devices 14 to be compressed by means of the rails 44, which have a taper at the leading edge to facilitate a progressive clamping action. The single action of installing the carrier tray containing the disk drive unit into the receiving frame enables the electrical connector (not shown) at the rear of the disk drive unit to align and connect with the corresponding connector in the receiving frame. The provision of lateral movement of the disk drive unit against the retaining devices provides that manufacturing tolerances can be allowed for without the need for a floating electrical connector at the rear of the receiving bay. The amount of lateral movement of the disk drive unit is within the limit of the movement enabled by the damping provided by the retaining devices as described above.

The overall arrangement illustrated has a low space requirement. The carrier tray with the retaining devices includes all of the clamping mechanism so that it is not necessary to suspend operation of an overall test system to service the clamping mechanism. The clamping mechanism can be serviced individually for each carrier.

It is to be appreciated that although in the embodiments illustrated and described hereinbefore there are shown four retaining devices 14 positioned approximately one at each corner of the carrier 4, numerous other arrangements can be provided in accordance with the invention. For example although it is preferred that at least one retaining device 14 is provided on each side of the carrier 4, at least some of the advantages of the invention can be obtained by providing a single retaining device 14 on one side of the carrier 4, with one or more fixed locations on the other side of the carrier 4 projecting from the side walls of the carrier 4 and locating against the side of the disk drive unit.

Numerous other arrangements can be made, for example two retaining devices 14 on one side of the carrier, and a single retaining device 14 on the other side of the carrier; two floating retaining devices 14 on one side of the carrier 4, and a single fixed location contact on the other side projecting from the carrier 4 to contact with the side of the disk drive; or two retaining devices 14, positioned one on each side of the carrier 4.

Embodiments of the present invention has been described with particular reference to the examples illustrated. However, it will be appreciated that variations and modifications may be made to the example described within the scope of the present invention.

The invention claimed is:

1. A mounting for a disk drive unit, the mounting comprising:
   a carrier for carrying a disk drive unit during required movement of said disk drive unit, the carrier defining a space into which said disk drive unit can be inserted and the carrier being adapted to be inserted with said disk drive unit into a receiving frame for operational use;
   at least one retaining device mounted on the carrier for securing said disk drive unit in the carrier, in which the or each retaining device is pivotally mounted on the carrier and is arranged to provide vertical positioning control of said disk drive unit in the carrier, in which the or each retaining device comprises an engaging member to engage with a corresponding engaging member on the disk drive unit when the disk drive unit is arranged within the carrier;
   in which the at least one retaining device being configured such that upon insertion of a disk drive into the carrier, the at least one retaining device automatically engages with said disk drive to apply a clamping force to the disk drive to secure the disk drive in the carrier, the at least one retaining device being further arranged to increase the clamping force on said disk drive when the carrier is inserted into the receiving frame;
   in which the at least one retaining device comprises a first end at which the engaging member is arranged and a second distal end, a pivot being provided between the first and second end.

2. A mounting according to claim 1, wherein the at least one retaining device comprises an engaging member to engage with a corresponding engaging member on the disk drive unit when the disk drive unit is arranged within the carrier.

3. A mounting according to claim 2, wherein the engaging member on the at least one retaining device comprises a projection adapted to be received in a corresponding recess in said disk drive unit.

4. A mounting according to claim 2, wherein the at least one retaining device is pivotally connected to the carrier in such a manner that in a rest position the engaging member is biased into the carrier.

5. A mounting according to claim 2, wherein the or each retaining device comprises a spring member to bias the engaging member into the carrier.

6. A mounting according to claim 1, further comprising shock mounts, the shock mounts being provided on a base of the carrier to receive the disk drive unit.

7. A mounting according to claim 6, wherein the shock mounts comprise spigots arranged on a base of shock absorbing material.

8. A mounting according to claim 1, further comprising a disk drive unit therein.

9. A mounting according to claim 1, wherein an axis of rotation of the pivotally mounted retaining device is substantially perpendicular to a plane of a bottom of the space into which said disk drive unit is inserted.

10. A mounting according to claim 1, in which there are provided four retaining devices.

11. A retaining device for retaining a disk drive unit in a mounting device according to claim 1, the retaining device comprising:
a connection point for pivotal connection to the mounting device and a spring member to bias the retaining device into the carrier of the mounting device when in rest position.

12. A retaining device for retaining a disk drive unit in a mounting device according to claim 1, the retaining device comprising:
a connection point for pivotal connection to the mounting device and a spring member to bias the retaining device into the carrier of the mounting device when in rest position, comprising a first end having an engagement member and a distal end, the connection point being provided between the first end and distal end.

13. A retaining device according to claim 12, comprising a damper provided on an external face of the first end.

14. A mounting for a disk drive unit, the mounting comprising:
a carrier for carrying a disk drive unit during required movement of said disk drive unit, the carrier defining a space into which said disk drive unit can be inserted; and,
at least one retaining device mounted on the carrier for securing said disk drive unit in the carrier, in which the or each retaining device is pivotally mounted on the carrier and is arranged to provide vertical positioning control of said disk drive unit in the carrier;
in which the retaining device comprises an engaging member to engage with a corresponding engaging member on disk drive unit when the disk drive unit is arranged within the carrier;
in which the carrier is adapted to be inserted with the disk drive unit into a receiving frame for operational use and the at least one retaining device comprises a first end at which the engaging member is arranged and a second distal end, a pivot being provided between the first and second end, wherein at the first end on an external face of the retaining device a damper is provided.

15. A mounting according to claim 14, wherein the damper comprises a damping material selected from the group consisting of sorbathane and silicone-free gel.

16. A method of loading a disk drive unit into a mounting having a carrier for a disk drive unit and comprising at least one retaining device mounted on the carrier for securing said disk drive unit in the carrier, in which the or each retaining device is pivotally mounted on the carrier and is provided with an engaging member to engage said disk drive and arranged to provide vertical positioning control of said disk drive unit in the carrier, in which the or each retaining device comprising a first end at which the engaging member is arranged and a second distal end, a pivot is provided between the first and the second end, the method comprising:
inserting said disk drive unit into the carrier such that upon insertion of the disk drive, the or each retaining member automatically acts on said disk drive unit to apply a clamping force to maintain said disk drive unit in the carrier; and
inserting the carrier into a receiving frame such that the clamping force on said disk drive is increased.

17. A method according to claim 16, comprising:
acting on the or each retaining member in such a manner to cause the or each engaging member to move out of the carrier;
inserting said disk drive unit into the carrier when the or each retaining member is in this outer position; and,
releasing the or each retaining member to grip said disk drive unit in position in the carrier.

* * * * *